United States Patent [19]

Ishikawa et al.

[11] 4,444,382
[45] Apr. 24, 1984

[54] SHEET FEEDING SYSTEM

[75] Inventors: Takuma Ishikawa; Toshio Matsui, both of Toyokawa, Japan

[73] Assignee: Minolta Camera KK, Osaka, Japan

[21] Appl. No.: 363,875

[22] Filed: Mar. 31, 1982

[30] Foreign Application Priority Data

Apr. 11, 1981 [JP] Japan .................................. 56-54805

[51] Int. Cl.³ .............................................. B65H 5/00
[52] U.S. Cl. ...................... 271/10; 271/111; 271/118; 271/122; 271/246
[58] Field of Search ........................ 271/3.1, 4, 10, 110, 271/111, 118, 126, 127, 122, 245, 246, 258, 259, 265

[56] References Cited

U.S. PATENT DOCUMENTS

| 3,469,834 | 9/1969 | Stange et al. | 271/10 |
| 3,514,098 | 5/1970 | Ostwald | 271/118 |
| 3,885,782 | 5/1975 | Wright | 271/110 |
| 4,025,187 | 5/1977 | Taylor et al. | 271/10 |
| 4,248,528 | 2/1981 | Sahay | 271/3.1 |
| 4,317,138 | 2/1982 | Bryan | 271/110 |
| 4,319,742 | 3/1982 | Ulseth | 271/118 |

*Primary Examiner*—Bruce H. Stoner, Jr.
*Assistant Examiner*—John A. Carroll
*Attorney, Agent, or Firm*—Watson, Cole, Grindle & Watson

[57] ABSTRACT

A sheet feeding system wherein, when a start signal for starting sheet feeding is given, a sheet tray is brought into contact with a first feed roller and at the same time the first feed roller is driven to rotate. When a first detection mechanism has detected the leading end of a sheet having reached between a second feed roller and a parting roller, the sheet tray is separated from the first feed roller and when the sheet is detected by the second detection mechanism, the second feed roller is stopped after a delay time that the leading end of the sheet contacts a stopper closing a sheet threading path for the sheet to be slightly looped, and the sheet threading path is opened upon the lapse of a predetermined time and the parting roller is then disengaged from the second feed roller.

5 Claims, 10 Drawing Figures

SHEET FEEDING SYSTEM

BACKGROUND OF THE INVENTION

1. Technical Field of the Invention

The present invention relates generally to sheet feeding system suited for sheet feeding in duplicating machines, printing machines etc. and more particularly to a system for automatically sending a sheet of document onto a document frame of an electronic photographic duplicating machine and stopping it in place.

2. Description of the Prior Art

In an electronic photographic duplicating machine, when a sheet feeding system for such as documents is provided above the main unit thereof, a sheet tray and a parting roller used to be normally arranged engageably and disengageably below a first feed roller so that the sheet tray is pressed on by the first feed roller for a sheet to be sent out at a time, while double feeding of sheets is prevented by the parting roller pressed against the first feed roller rotating in the same direction therewith.

In an electronic photographic duplicating machine of such a setup, however, it was often the case that efficient sheet feeding by said function of the parting roller was infeasible as, when the parting roller, for instance, was not functioning well, the sheet tray, once released of the pressure contact with the first feed roller, was pressed again to the first feed roller for feeding of the next sheet, even when the next sheet was already engaged by the first feed roller, this unnecessary step being repeated. Also, there was an inconvenience that when adjacent sheets were partly fed overlappingly (double fed) by the first feeding roller, despite the fact that it did not necessarily result in jamming, the condition could not be distinguished, thus making it difficult to cope readily with possible occurence of jamming.

As the prior art in the technical field of the present invention are known U.S. Pat. No. 3,469,835, U.S. Pat. No. 4,025,187 and U.S. Pat. No. 4,248,528.

SUMMARY OF THE INVENTION

The object of the present invention is to provide a sheet feeding system for improving the efficiency of sheet feeding, being capable of detecting such feeding faults as double feeding or jamming of sheets and coping with the detected condition readily as well as of parting sheets efficiently.

BRIEF DESCRIPTION OF THE DRAWING

FIG. 3 (a) is a front elevational view showing the working mechanism of a sheet tray, parting roller and stopper.

FIG. 3 (b) is a side elevational view of a supporting member.

FIG. 5a drawn in solid line is a flow chart showing the order of the operating and control steps the sheet feeding system of the invention undergoes when a sheet of paper such as a document is to be fed, while

DESCRIPTION OF THE PREFERRED EMBODIMENTS

Figure 1:
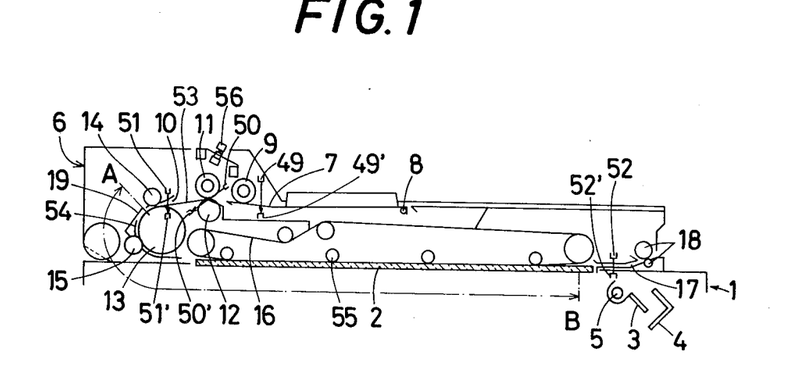
FIG. 1 is a crosssectional view of a preferred embodiment of the present invention.

Referring now to FIG. 1, a main unit 1 of a duplicating machine comprises a top document frame glass 2 and a scanning optics system disposed thereunder consisting of a first and second mirrors 3 and 4 and an illumination lamp 5 attached to the No. 1 mirror 3 which move at a speed ratio of 2:1 to scan a document placed on the document frame glass 2 and have a photosensitive material (not shown) exposed accordingly and successively.

A sheet feeding system of the present invention disposed above the document frame glass 2 of the duplicating machine main unit 1 is generally shown as 6. On the sheet receiving side of said system is provided a sheet tray 7 for documents in sheet form arranged to be oscillated vertically about a shaft 8 at the rear end thereof. When said sheet tray moves up, the uppermost sheet of the stack in the sheet tray 7 is pressed against a roller 9 and the sheet is fed thereby into a sheet threading path 10 inside said system 6. The sheet threading path 10 extends from where a second feed roller 11 and a parting roller 12 are arranged one upon the other through a turning section along the peripheral surface of a sheet feed roller 13 and between a pinch roller 14 and a fast forward roller 15 arranged peripherally thereto to between the beginning end of a sheet conveyor belt 16 which is always in close contact with the document frame glass 2 of the duplicating machine main unit 1 and defines the bottom of the sheet feeding system 6 and the document frame glass 2, the path thus formed to be continuous.

On the other hand, a sheet outlet path 17 is formed to extend from between the other end of the document frame glass 2 and the other end of the sheet conveyor belt 16. 18 is a pair of sheet outlet rollers arranged amid the sheet outlet path 17.

The sheet feed roller 13 and the sheet conveyor belt 16 are driven by an electric motor (not shown) to feed the sheet from a predetermined reference position A in the sheet threading path 10 to a predetermined sheet stopping position B. At the predetermined reference position A in the sheet threading path 10 there is provided a stopper 19 for once stopping the incoming sheet when it, having been fed from the sheet tray 7 by the first feed roller 9, has entered the sheet threading path 10 past between the second feed roller 11 and the parting roller 12.

Figure 3A:
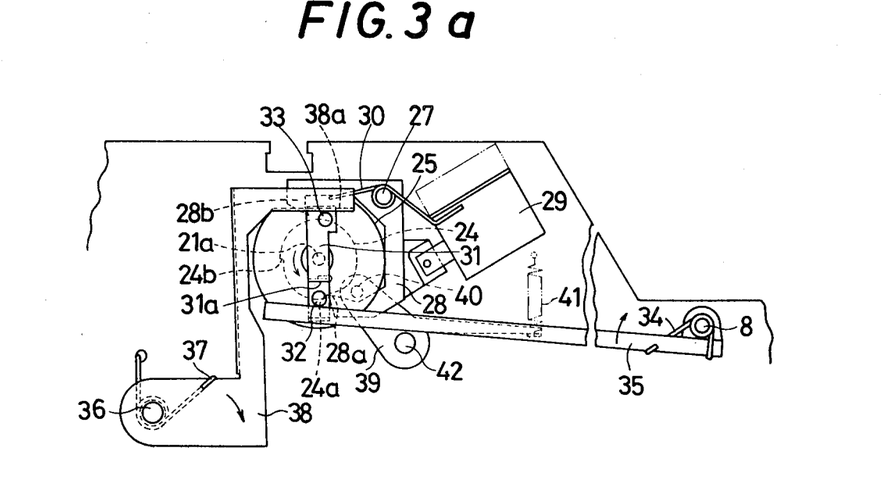
Figure 3B:
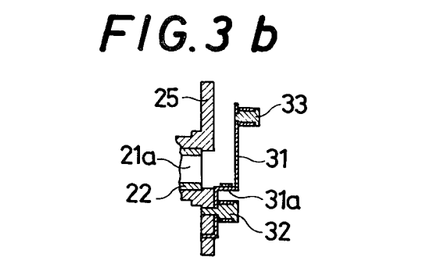
Figure 4:
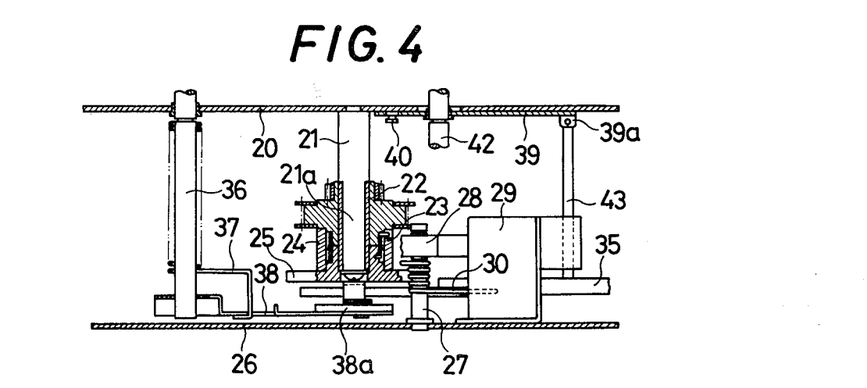
FIG. 4 is a partly sectioned plan view corresponding to FIG. 3 (a).

FIGS. 3(a), (b) and FIG. 4 show the mechanism for moving said sheet tray 7, stopper 19 etc. In the figures 21 is a supporting shaft fixedly secured to an inner frame 20 and 22 is a bush set on a part thereof reduced in diameter 21a lest it should drop off. This bush 22 has set thereon a disc cam 24 and a disc 25 driven by an electric motor (not shown) over a kick spring 23. In the outer periphery of the disc cam 24 are provided 2 latching dents 24a and 24b 90° apart. There is provided a shaft 27 extending from an outer frame 26 and adjacent to the disc cam 24. This shaft 27 has pivoted thereon a latch member 28 with pawls 28a and 28b formed at each end thereof respectively which is J-shaped surrounding part of the disc cam 24. This latch member 28 is retained by a solenoid 29 fixedly attached to the outer frame 26 to be rotatable counterclockwise against the force of a spring 30. On the front side of the disc 25 there are provided pins 32 and 33 secured to a supporting member 31 at different heights vertically from the surface of the disc 25. The pin 32 is in contact with one end of a lever 35 urged clockwise at the other end by a spring 34 pivoted on a shaft 8. The other pin 33 is in contact with the lower edge 38a of one end of a stopper operating lever 38 urged clockwise by a spring 37 pivoted on a shaft 36 of a stopper 19 at the other end thereof. Hence, the lever 38 follows the movement of the pin 33 as the disc 25 rotates to oscillate the lever 35. As the pin 32, having turned approx. 90° from its position shown in FIG. 3(a), further rotates 270°, the lever 35 is caused to have its pressing urge to the pin 32 released by the bent part 31a of the supporting member 31.

Designated 39 is a parting roller operating lever pivoted on a pin 40 secured to the inner frame 20 at one end thereof, which is urged by a spring 41 at the other end thereof to move a parting roller shaft 42 carrying said operating lever 39 toward the side of the second feed roller 11. The urge of the spring 41 can be released by a lever 43 connected to the upper face of a bent part 39a formed at the other end of said operating lever 39 and secured at the other end to the lever 35.

Figure 2:
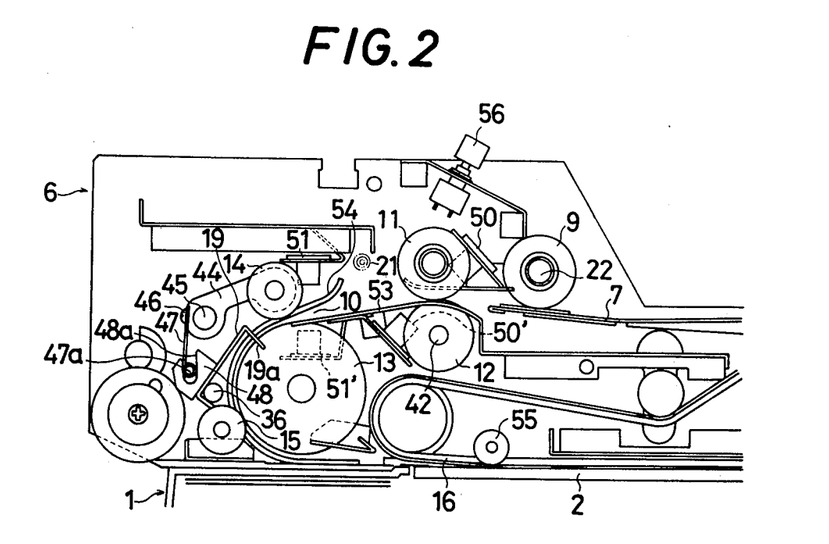
FIG. 2 is an enlarged sectional view of a key section thereof.

Referring now to FIG. 2, a pinch roller 14 linked with shaft 45 over an arm 44 has the other end 47a of a connecting member 47 secured to the arm 44 by a screw 46 carried in a notch 48a of an operating member 48 secured to the upper face of the stopper 19, and this stopper 19 is engaged to and disengaged from the sheet feed roller 13 as an operating shaft 36 fixedly mounted on the inside thereof rotates.

49 and 49' in FIG. 1 are incoming sheet detection means provided on this side of the first feed roller 9, 50 and 50' are a first detection means arranged before and after the first feed roller 11 and the parting roller 12 (Also see FIG. 2.), 51 and 51' are a second detection means provided immediately before the pinch roller 14, and 52 and 52' are a third detection means provided before the sheet outlet roller 18, and each of these detection means detects passage of the sheet such as document at each position for the necessary steps to be taken in the predetermined sequence accordingly, and normally consist of photo-sensors and other suitable switch means. 53 is a first guide means for guiding the sheet having passed the second feed roller 11 onto the sheet feed roller 13, 54 a second guide means for turning the sheet having passed the first guide means 53 along the outer periphery of the sheet feed roller 13, 55 is a guide roller for pressing the sheet conveyor belt 16 against the surface of the document frame glass 2 and 56 is a start switch for starting said conveyor belt 16.

Figure 5A:
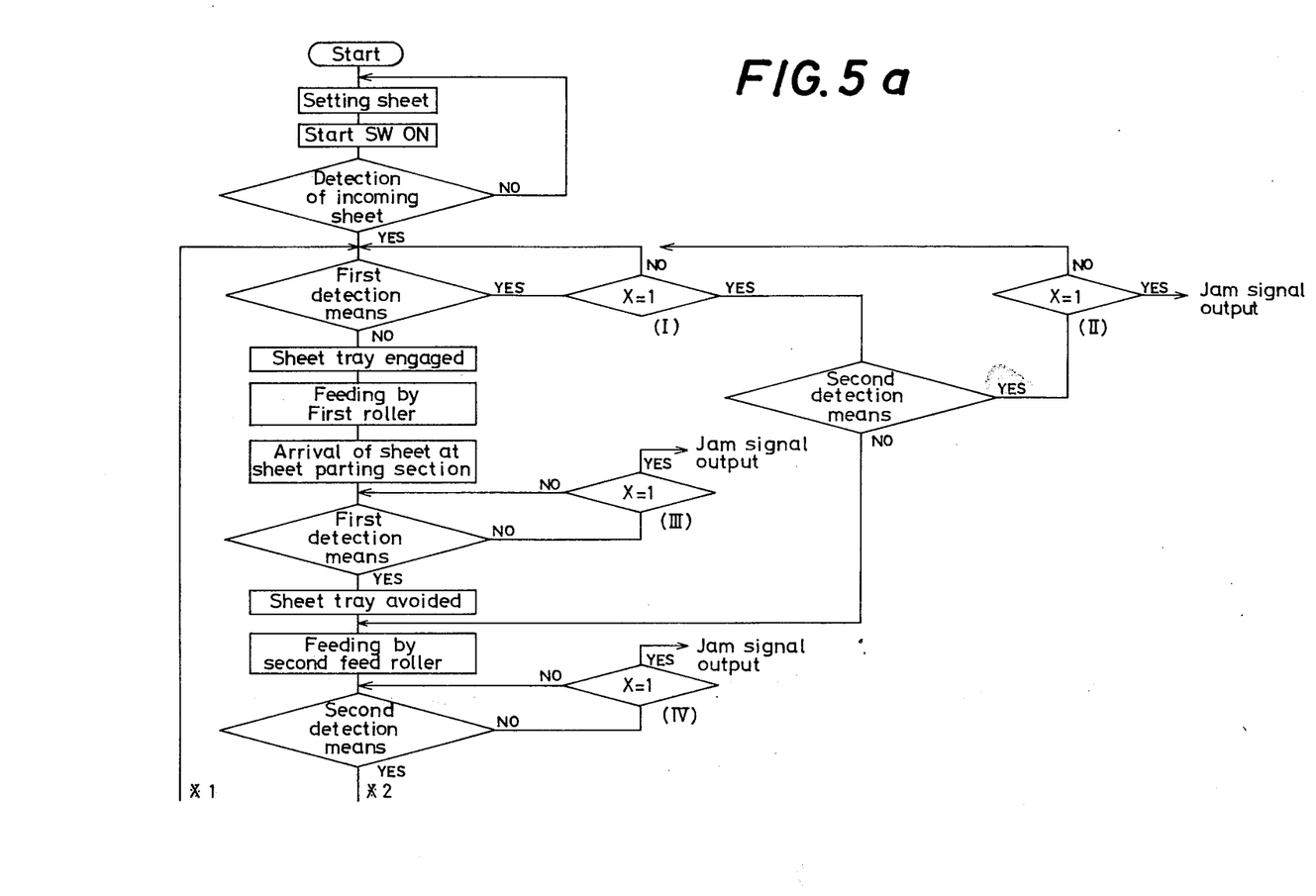
Figure 5B:
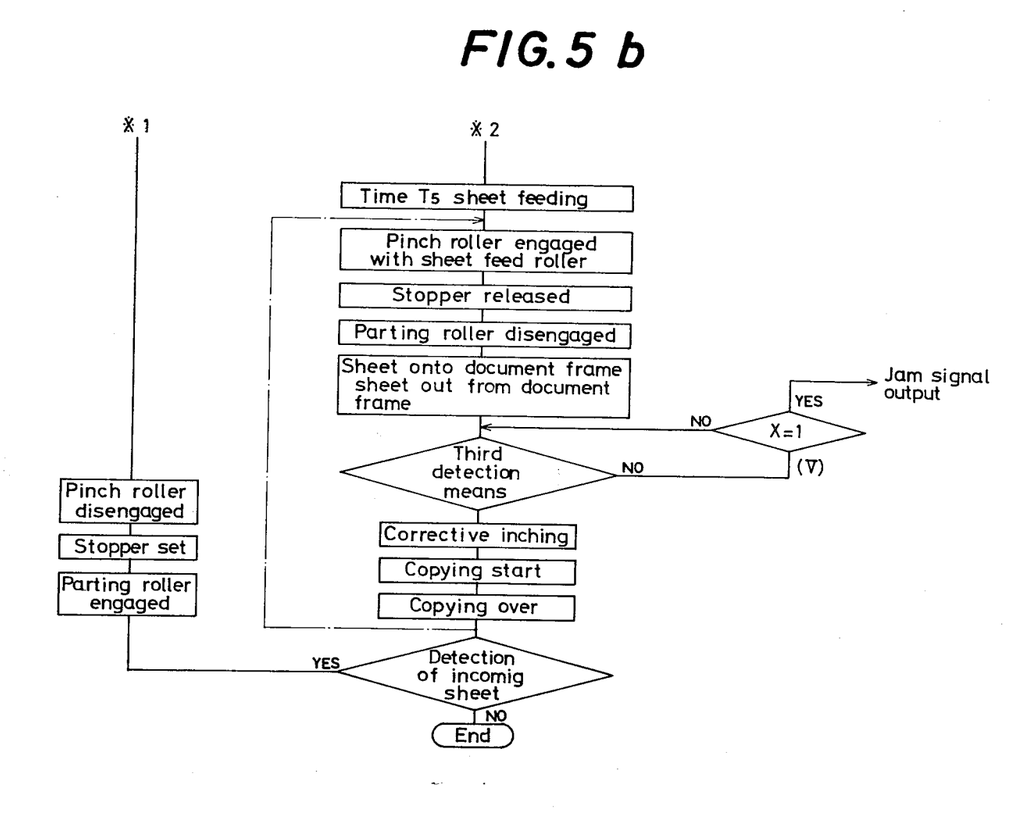
FIG. 5b is a continuation of the flow chart of FIG. 5a wherein one-dot chain line is used in addition to solid line to show a flow chart for the case of feeding a plurality of sheets in succession.
Figure 6:
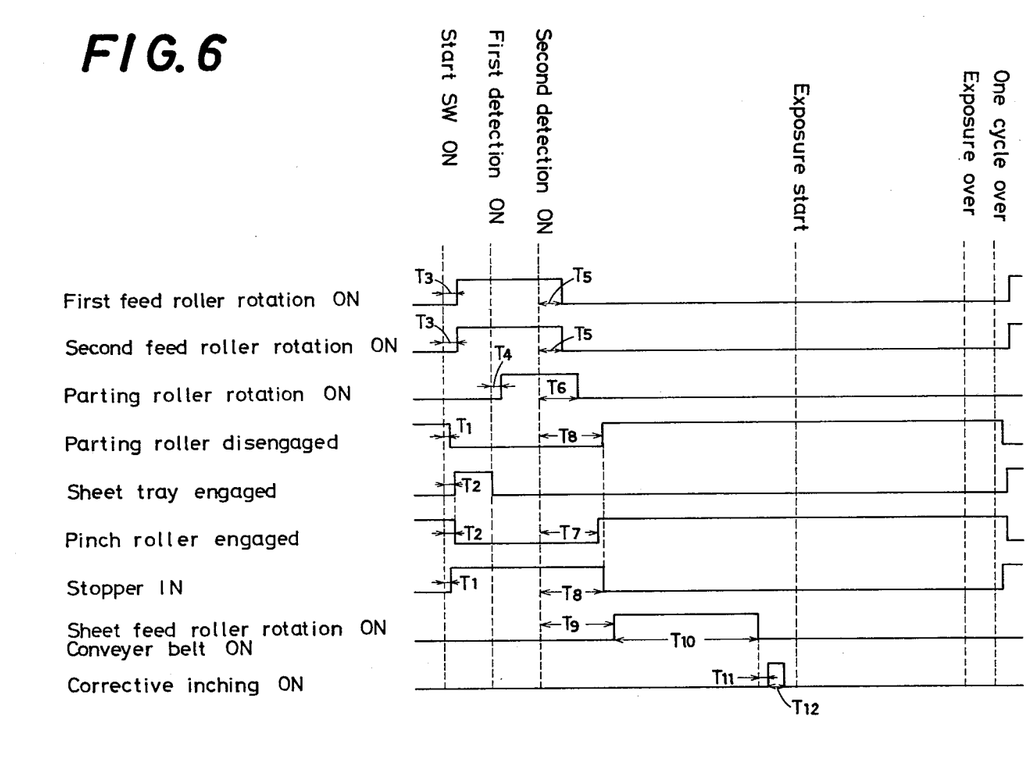
FIG. 6 is a time chart for the case of single sheet feeding.

Now described is the sequence of operation steps undergone by the system of the present invention whose set-up has been described above under reference to the flow charts of FIGS. 5a and 5b and the time chart of FIG. 6.

Referring to FIG. 1, the sheet tray 7 as shown is at the lower limit of its stroke off the first feed roller 9 and is ready for receiving sheets such as documents. When the start switch 56 is now turned ON and the arrival of the sheet is confirmed by the incoming sheet detection means 49 and 49', the solenoid 29 operates for a predetermined length of time to cause the latch member 28 to rotate counterclockwise about the shaft 27 against the force of the spring 30 and the disc cam 24 is released with the pawl 28a off the latching dent 24a. The disc cam 24, which has been arrested by the kick spring 23, is now free to rotate counterclockwise approx. 180° until it is checked by the pawl 28b of the latch member 28 engaging the dent 24a.

As the disc cam 24 rotates, the disc 25 connected with it over the kick spring 23 is also caused to rotate in the same direction. Accordingly, over the levers 35 and 38 pressed against the pins 32 and 33 secured to the disc 25 by the springs 34 and 37 and the lever 43 fixedly connected to the lever 35, the shaft 8 at the rear end of the sheet tray 7 and the operating shaft 36 of the stopper 19 are caused to rotate clockwise. And, at the same time, the parting roller operating lever 39 is caused to rotate counterclockwise about the pin 40. Hence, upon the lapse of time $T_1$ after turning ON of the start switch 56 the parting roller 12 is pressed against the second feed roller 11. At the same time the pawl 19a of the stopper 19 reaches into the sheet threading path 10, and upon the lapse of time $T_2$, i.e. with a small time lag, the sheet tray 7 is pressed against the first feed roller 9 with the sheet on it clamped therebetween, and at the same time the pinch roller 14 comes off the sheet feed roller 13 to open the sheet threading path 10. Then upon the lapse of time $T_3$ a little longer than $T_2$ the first and second feed rollers 9 and 11 are driven by an electric motor (not shown).

By the abovementioned sequence of operation steps the sheet on the sheet tray 7 is first led by the No. 1 feed roller 9 to between the second feed roller 11 and the parting roller 12. Upon detection of the condition, i.e. the sheet clamped between the rollers 11 and 12, by the first detection means 50 and 50', the solenoid 29 is turned ON and OFF to rotate the disc cam 24 ¼ of a turn. The sheet tray 7 is thereby lowered as it turns counterclockwise with the shaft 8 as fulcrum to come off the first feed roller 9 and the sheet is now fed into the sheet threading path 10 by the second feed roller 11 alone. Upon the lapse of time $T_4$, i.e. a little after the detection of the sheet by the first detection means 50 and 50', the parting roller 12 starts rotating in the sense opposite to the sheet feeding direction (i.e. in the same sense as the second feed roller 11). When the uppermost sheet being fed into the sheet threading path 10 by the second feed roller 11 is accompanied by another sheet underneath adhering thereto feeding of such accompanying sheet is prevented by friction until the parting roller 12 starts rotating. The parting roller 12, when it is started, acts sending back the accompanying sheet and thus ensured is unfailing feeding of a single sheet at a time into the sheet threading path 10.

When the sheet has come close to between the sheet feed roller 13 and the pinch roller 14, the condition is detected by the second detection means 51 and 51' and after the lapse of time $T_5$ required for the sheet being fed by the second feed roller 11 to come into contact with the pawl 19a of the stopper 19 to be looped slightly thereby, i.e. for the sheet to be forced to stop with its leading end at the predetermined reference position A arrested by the pawl 19a of the stopper 19 without fail, the first and second feed rollers 9 and 11 are stopped. At this stage, however, the rear end of the sheet is still clamped between the first feed roller 11 and the parting roller 12, hence the state of the sheet looped slightly with its leading end in contact with the pawl 19a of the stopper 19 is maintained.

Then, upon the lapse of time $T_6$ after the detection by the second detection means 51 and 51', i.e. a little later than the stopping of the first and second feed rollers 9 and 11, the parting roller 12 stops rotating, and still later, upon the lapse of time $T_7$, the pinch roller 14 is pressed against the sheet feed roller 13 for the sheet with its leading end positioned in contact with the pawl 19a of the stopper 19 to be kept clamped. A moment later, upon the lapse of time $T_8$, the stopper 19 has its pawl 19a withdrawn from the sheet threading path 10 to open it and at the same time the parting roller 12 comes off the second feed roller 11. Still a little later, upon the lapse of time $T_9$, the sheet feed roller 13 and the sheet conveyor belt 16 are driven by the electric motor (not shown), and the sheet stopped at said predetermined reference position A is fed toward the predetermined stopping position B.

Upon the lapse of time $T_{10}$ required for the sheet to reach the predetermined stopping position B, the sheet feed roller 13 and the sheet conveyor belt 16 are stopped and thereafter for a proper length of time $T_{12}$ after the lapse of the preset time $T_{11}$ the sheet stopped a little short of the predetermined stopping position B considering the inertia force of the sheet feed roller 13 and the sheet conveyor belt 16 is inched to stop precisely at the predetermined stopping position B by a corrective inching device (not shown).

After the sheet has been stopped precisely at the predetermined stopping position B by said corrective inching a proper "copying start" signal is given for a sequence of copying operation beginning with exposure to be started in the duplicating machine main unit 1. Upon completion of the copying procedure, a proper "copying over" signal is given for the sheet on the document frame glass 2 to be sent out into the outlet path 17 as driving of the sheet feed roller 13 and the sheet conveyor belt 16 is resumed. When the sheet sent into the outlet path 17 has been detected by the third detection means 52 and 52', the pair of outlet rollers 18 are driven for a predetermined length of time for the sheet to be let out.

When a plurality of copies are to be taken of one sheet of document or the like, the copying procedure may be repeated the required number of times with the sheet kept stopped at the predetermined stopping position B.

In the flow chart of FIG. 5a, when the judging flags X shown in I and II are set to be X=1 upon turning ON of the start switch 56, a proper "jam" display can be caused to be made by outputting an abnormal signal indicating the occurence of jamming with simultaneous stopping of sheet feeding when the presence of sheet has been detected by both the first detection means 50 and 50' and the second detection means 51 and 51'. Similarly, when the presence of a sheet is detected by the first detection means 50 and 50' but not by the second detection means 51 and 51' with the start switch 56 ON, the second feed roller is driven to further feed the sheet.

Referring to FIGS. 5a and 5b, when the judging flags X shown in III, IV and V connected with the first detection means 50, 50', the second detection means 51, 51' and the third detection means 52, 52' respectively are set to be X=1 upon time-up of proper jam detection timers connected with the respective detection means, each detection means is made to output an "abnormal" signal indicating occurence of jamming separately for a proper "jam" display to be made with simultaneous stopping of sheet feeding, when said timer has run out with the presence of a sheet not detected by each detection means, hence growth of the trouble in the event of jamming can be prevented.

Figure 7:
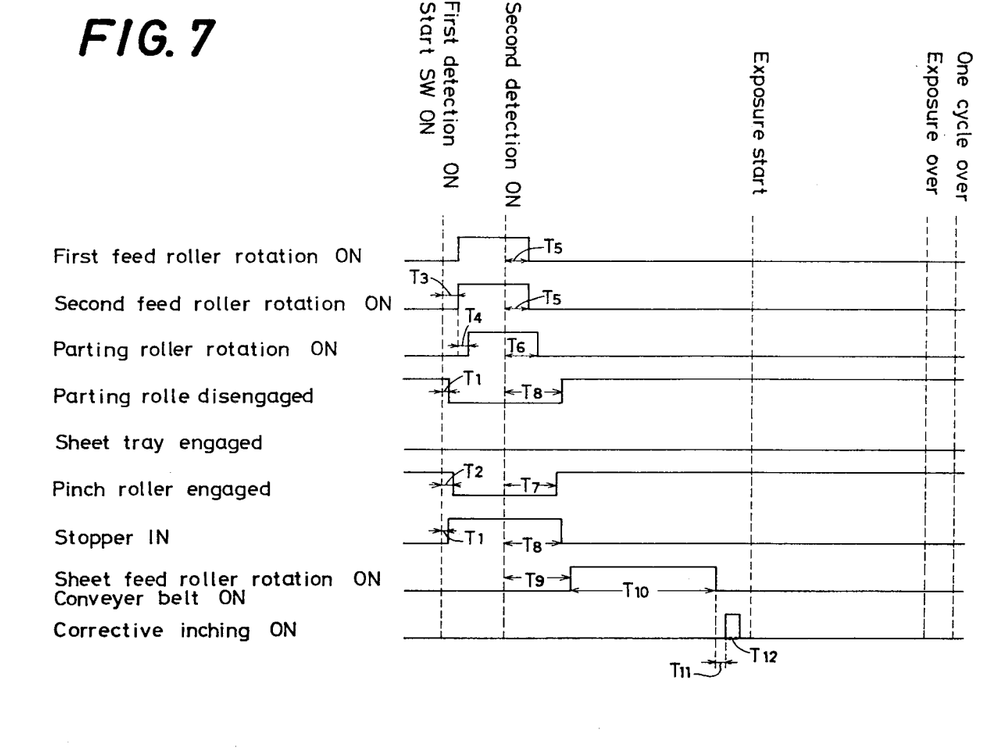
FIG. 7 is another time chart for the case where the leading end of a sheet is already detected by a first detection means at the time of start of sheet feeding.

Given in FIG. 7 is the time chart showing the condition of sheet feeding when the leading end of a sheet is already detected by the No. 1 detection means at the time of start of the feeding of a sheet such as a document. The greatest point of difference from the time chart of FIG. 6 is that the step of engaging the sheet tray 7 is omitted, this meaning that feeding of a new sheet is not done even if the first feed roller 9 should be driven with the sheet already between the second feed roller 11 and the parting roller 12 alone being fed further, and the double-feeding is thus prevented with omission of unnecessary feeding steps for improvement of the sheet feeding efficiency.

When a plurality of sheets of such as documents piled up on the sheet tray 7 are copied successively, the time required for a cycle of copying procedure can be shortened by arranging so that the next sheet is sent in by the operation to send out the sheet having undergone the copying procedure on the document frame glass 2, which is feasible when the next sheet is fed from the sheet tray 7 up to the predetermined reference position A amid the sheet threading path 10 stopped there by the pawl 19a of the stopper 19 while the previous sheet is undergoing exposure. It is also possible to have said simultaneous sending out of the finished sheet and sending in of the next sheet started upon completion of exposure before the copying procedure is over.

The flow chart for this case is indicated by the one-dot chain line additionally written as feed back line on the flow chart of FIG. 5 drawn in solid line, in which during the time interval from the start to the finishing of copying procedure feed-back is made from the stage after copying over and before detection of the incoming sheet for the steps up to "time $T_5$ sheet feeding" to be finished.

Figure 8:
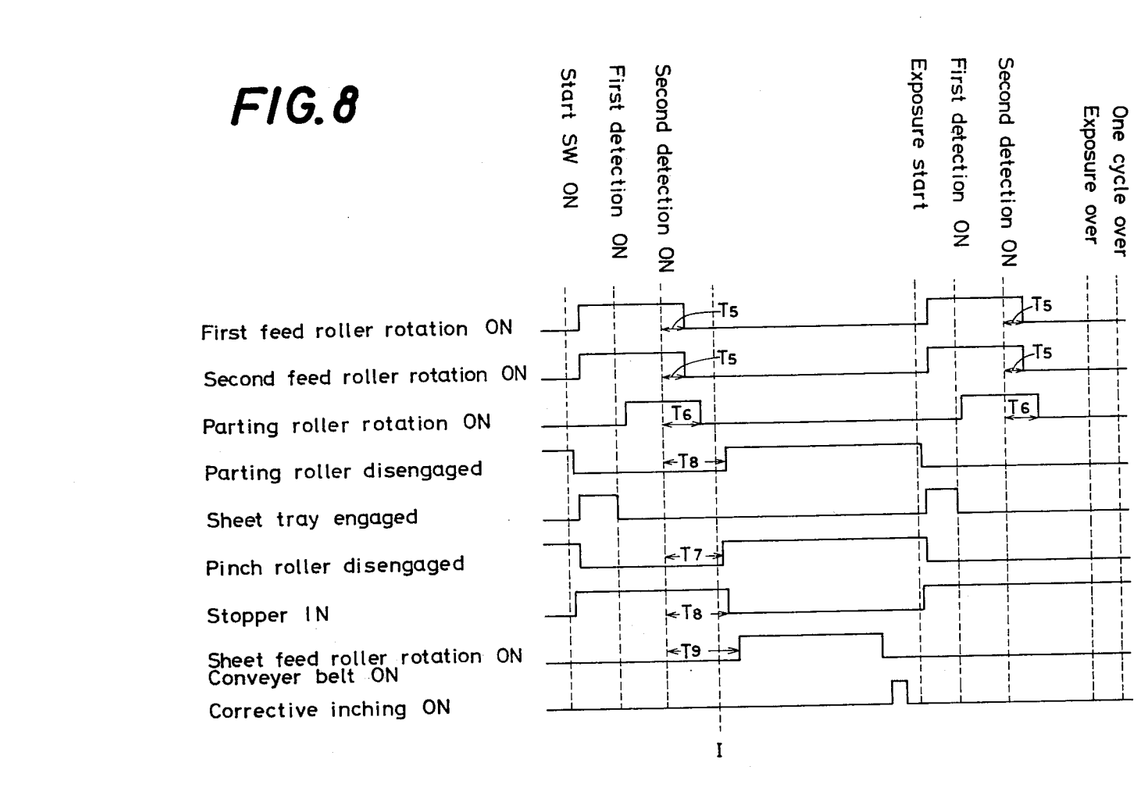
FIG. 8 is still another time chart showing the sequence of operation when a plurality of sheets such as documents are fed in succession.

The time chart of FIG. 8 is for the case where a plurality of sheets such as documents are copied successively, and in this case the steps after the dash line I are repeated in cycles until the sheets on the sheet tray 7 are all finished.

According to the present invention, the parting roller 12 arranged to rotate in the same direction as the second feed roller 11 is disposed separate from the sheet tray 7 which can be brought into as well as out of contact with the first feed roller 9 and the first detection means 50 and 50' is provided where the second feeding roller 11 and the parting roller 12 are located and the second detection means 51 and 51' is provided in the vicinity of the stopper 19 for opening and closing the sheet threading path 10, hence, when sheet feeding is done by the first feed roller 9 with a sheet already under the first feed roller 9, it is possible to have the leading end of the sheet detected by the first detection means 50 and 50' for the sheet tray 7 to be disengaged from the first feed roller 9. Later, when the sheet is detected by the second detection means 51 and 51', there is provided a control means to stop the second feed roller 11 after a time lag set from said moment of detection required for the leading end of the sheet to come into contact with the stopper 19 and to be slightly looped, hence improved is the sheet holding effect as well as the sheet parting effect of the parting roller 12 and the sheet feeding efficiency of the system is thus improved.

If said control means is so adjusted that when a sheet is detected by both first and second detection means at the time of driving the first feed roller 9, an "abnormal" signal is output, detection of the condition when jamming has resulted from double-feeding of sheets can be made without delay for the necessary countermeasures to be taken quickly. Moreover, when partial double-feeding of sheets does not cause jamming, for instance when the next sheet is engaged by the second feed roller 11, the unnecessary step of bringing the sheet tray 7 into contact with the first feed roller 9 can be omitted for improvement of the sheet feeding efficiency.

What is claimed is:

1. A sheet feeding system for automatically feeding sheets from a sheet tray, including:
    a first feed roller means for sending out sheets on a sheet tray;
    a drive means for bringing said sheet tray into or out of contact with said first feed roller means;
    a second feed roller means located downstream of said first feed roller means in the direction of sheet feeding;
    a parting roller means arranged to be engageable to and disengageable from said second feed roller means and to be driven to rotate so as to send said sheet in a direction opposite to normal direction of sheet feeding;
    a first detection means for detecting the leading end of said sheet when it has reached between said second feed roller means and said parting roller means;
    a stopper means located further downstream of said second feed roller means in the direction of sheet feeding which is driven to open or close a sheet threading path;
    a second detection means for detecting the leading end of said sheet when it has reached the vicinity of said stopper means;
    a transmitting means for a start signal for starting said sheet feeding; and
    a control means whereby upon transmission of said start signal a drive means is started to bring said sheet tray into contact with said first feed roller means as well as to rotate said first feed roller means and upon detection of the leading end of said sheet by said first detection means said sheet tray is caused to be separated from said first feed roller means and later upon detection of said sheet by said second detection means said second feed roller is stopped after a delay time that said sheet is slightly looped with its leading end in contact with said stopper means closing said sheet threading path and upon the lapse of a predetermined time said stopper means is driven to open said sheet threading path with simultaneous disengaging of said parting roller means from said second feed roller means.

2. A sheet feeding system as recited in claim 1, wherein a sheet feed roller means and a pinch roller means engageable thereto and disengageable therefrom are located in the vicinity and upstream of said stopper means in the direction of sheet feeding, said pinch roller means is controlled to come into contact with said sheet feed roller means immediately before said sheet threading path is opened by said stopper means so that said sheet is clamped between said pinch roller means and said sheet feed roller means immediately before said sheet threading path is opened by said stopper means.

3. A sheet feeding system as recited in claim 1 or claim 2, wherein said control means acts to prevent driving of said sheet tray in the direction to come into contact with said first feed roller means when a sheet is already detected by said first detection means at the moment of transmission of said start signal.

4. A sheet feeding system as recited in claim 1 or claim 2, wherein said control means outputs an "abnormal" signal when said sheet is detected by both said first and said second detection means at the moment of transmission of said start signal.

5. A sheet feeding system as recited in claim 1 or claim 2, wherein said sheet feeding system is connected with a duplicating machine electrically as well as mechanically, a third detection means is provided for detection of said sheet on said sheet tray and said control means acts upon receipt of a predetermined signal from said duplicating machine with the presence of said sheet detected by said third detection means to cause said sheet to be sent up to the position of said stopper means to wait there.

* * * * *